United States Patent
Turner et al.

(10) Patent No.: US 9,823,344 B2
(45) Date of Patent: Nov. 21, 2017

(54) FEATURE-BASED TRACKING OF MOVING OBJECTS

(71) Applicants: Ryan D. Turner, Santa Cruz, CA (US); Steven Bottone, Poway, CA (US); Clay J. Stanek, Sterling, VA (US)

(72) Inventors: Ryan D. Turner, Santa Cruz, CA (US); Steven Bottone, Poway, CA (US); Clay J. Stanek, Sterling, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 296 days.

(21) Appl. No.: 14/563,215

(22) Filed: Dec. 8, 2014

(65) Prior Publication Data

US 2016/0161607 A1    Jun. 9, 2016

(51) Int. Cl.
*G01S 13/08* (2006.01)
*G01S 13/72* (2006.01)

(52) U.S. Cl.
CPC .................. *G01S 13/726* (2013.01)

(58) Field of Classification Search
CPC ..................................... G01S 13/726
USPC ............................. 342/95, 96, 146
See application file for complete search history.

(56) References Cited

U.S. PATENT DOCUMENTS

| | | | | |
|---|---|---|---|---|
| 5,379,044 A * | 1/1995 | Carlson | ............... | G01S 13/726 342/90 |
| 7,266,042 B1 * | 9/2007 | Gent | ............... | G01S 13/726 342/195 |
| 7,460,951 B2 * | 12/2008 | Altan | ............... | G01S 13/726 340/903 |
| 7,817,079 B1 * | 10/2010 | Funk | ............... | G01S 7/003 342/41 |
| 8,681,041 B2 * | 3/2014 | Rojas | ............... | G01S 13/68 342/76 |

(Continued)

OTHER PUBLICATIONS

A. Mazzù, S. Chiappino, L. Marcenaro and C. S. Regazzoni, "A track-before-detect algorithm using joint probabilistic data association filter and interacting multiple models," 2014 IEEE International Conference on Image Processing (ICIP), Paris, 2014, pp. 4947-4951.*

(Continued)

*Primary Examiner* — Marcus E Windrich
(74) *Attorney, Agent, or Firm* — Tarolli, Sundheim, Covell & Tummino LLP

(57) ABSTRACT

Systems and methods are provided for tracking moving objects. A sensor system is configured to measure a position of each of a plurality of moving objects as a set of measurements. A track assignment component is configured to accept the set of measurements from the sensor system and assign a subset of the measurements to respective tracks. The tracks represents the motion of respective objects. The track assignment component represents a cost calculation component configured to provide a cost matrix from at least a change point detection analysis of a feature associated with the set of measurements and an object assignment component configured to assign the subset of the measurements to respective tracks. A filtering component is configured to update respective associated states of tracks representing the plurality of moving objects according to the set of measurements and the assignment of the subset of the measurements to respective tracks.

18 Claims, 3 Drawing Sheets

(56) References Cited

U.S. PATENT DOCUMENTS

| | | | | |
|---|---|---|---|---|
| 2003/0200065 | A1* | 10/2003 | Li | G06F 17/10 703/2 |
| 2004/0030500 | A1* | 2/2004 | Struzinski | G01S 15/66 701/302 |
| 2008/0111730 | A1* | 5/2008 | Ding | G01S 13/726 342/90 |
| 2009/0231183 | A1* | 9/2009 | Nettleton | G01S 7/003 342/95 |
| 2012/0221273 | A1* | 8/2012 | Furukawa | G01S 7/003 702/94 |
| 2013/0006577 | A1* | 1/2013 | Mathews | G01S 13/726 702/150 |
| 2013/0076558 | A1* | 3/2013 | Allam | G01S 13/726 342/107 |
| 2013/0229298 | A1* | 9/2013 | Eckstein | G01S 13/726 342/107 |
| 2014/0324339 | A1* | 10/2014 | Adam | G01S 13/726 701/519 |

OTHER PUBLICATIONS

S. Bidon, A. Tamalet and J. Y. Tourneret, "Variational Bayesian inference for sparse representation of migrating targets in wideband radar," 2013 IEEE Radar Conference (RadarCon13), Ottawa, ON, 2013, pp. 1-5.*

* cited by examiner

FEATURE-BASED TRACKING OF MOVING OBJECTS

BACKGROUND OF THE INVENTION

Field of the Invention

The invention relates generally to object tracking, and more specifically, to the efficient use of features in tracking moving objects.

Background of the Invention

Feature-aided tracking attempts to improve tracking performance focusing on improvements to the data association process by incorporating other sensor measurements, or quantities derived from other measurements, in addition to the usual kinematic measurements. Features can be continuous quantities such as radar cross section (RCS), length of target, and intensity, or discrete, categorical values, often referred to as attributes. Examples of attribute data include an Identification: Friend or Foe (IFF) ID, a number of engines, or a target type. In practice, we distinguish attributes from features because the techniques used to include such data in tracking calculations are somewhat different, but for the purpose of simplicity, herein the term "feature" to describe any data used in the tracking analysis other than kinematic data such as position and velocity. If multiple targets have similar kinematic measurements, a tracker using only kinematic measurements has trouble distinguishing the targets. The addition of other feature measurements may enhance the data association process and lead to the successful tracking of the closely spaced targets.

SUMMARY OF THE INVENTION

In accordance with an aspect of the present invention, a system is provided for tracking moving objects. A sensor system is configured to measure a position of each of a plurality of moving objects as a set of measurements. A track assignment component is configured to accept the set of measurements from the sensor system and assign a subset of the measurements to respective tracks. The tracks represent the motion of respective objects. The track assignment component represents a cost calculation component configured to provide a cost matrix from at least a change point detection analysis of a feature associated with the set of measurements and an object assignment component configured to assign the subset of the measurements to respective tracks. A filtering component is configured to update respective associated states of tracks representing the plurality of moving objects according to the set of measurements and the assignment of the subset of the measurements to respective tracks.

In accordance with another aspect of the present invention, a method is provided for tracking moving objects. A first set of measurements, representing a plurality of moving objects, is received, with each measurement having an associated location and a value for at least one feature. A set of likelihood values, representing expected values for a second set of measurements, is determined from the first set of measurements via a change point detection algorithm. A second set of measurements representing the plurality of moving objects is received. A lowest cost assignment of the second set of measurements to respective tracks representing the plurality of moving objects from the set of likelihood values is determined. A state associated with the tracks is updated according to assigned measurement values.

In accordance with yet another aspect of the present invention, a non-transitory computer readable medium stores executable instructions readable by an associated processor to track at least respective positions of a plurality of moving objects. The executable instructions include a track assignment component configured to receive a set of measurements representing at least a position and a radar cross-section of each of the plurality of moving objects and assign a subset of the measurements to respective tracks. Each track represents the motion of an object of the plurality of moving objects. The track assignment component includes a cost calculation component configured to provide a cost matrix from at least a Bayesian online change point detection analysis of the radar cross-section associated with the set of measurements and an object assignment component configured to assign the subset of the measurements to respective tracks. A filtering component is configured to update respective associated states of tracks representing the plurality of moving objects according to the set of measurements and the assignment of the subset of the measurements to respective tracks.

BRIEF DESCRIPTION OF THE DRAWINGS

The features, objects, and advantages of the invention will become more apparent from the detailed description set forth below when taken in conjunction with the drawings, wherein.

DETAILED DESCRIPTION OF THE INVENTION

Figure 1:
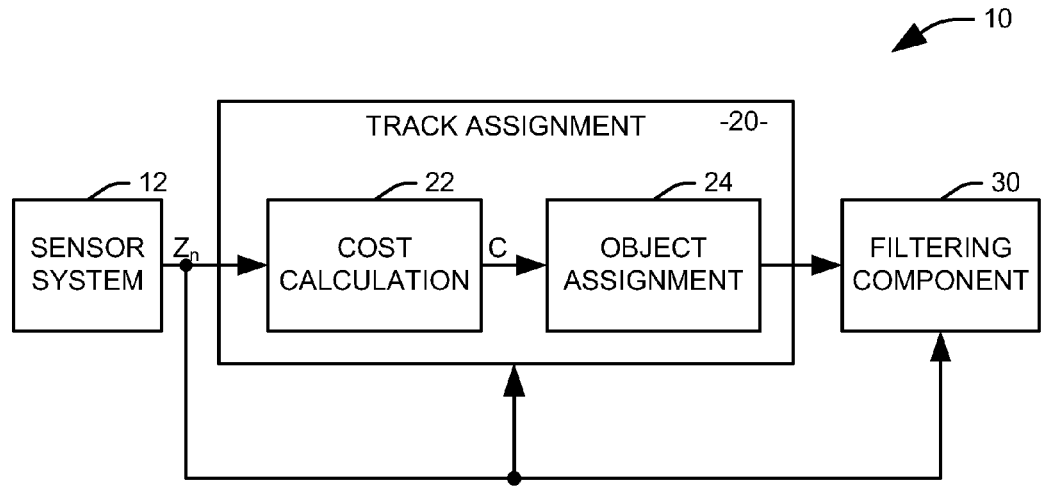
FIG. 1 illustrates a system for tracking a plurality of moving objects.

FIG. 1 illustrates a system 10 for tracking a plurality of moving objects. The system 10 includes a sensor system 12 configured to measure a position of each of the plurality of moving objects to provide a set of measurements, $Z_n$, including at least a position for each object and an associated feature. In one example, the sensor system 12 is a radar system, and the set of measurements includes at least a three-dimensional position vector of each sensed object in space and a radar cross-section. The set of measurements is provided to a track assignment component 20 configured to assign a subset of the measurements to respective tracks representing the motion of an object of the plurality of moving objects.

The track assignment component 20 includes a cost calculation component 22 configured to provide a cost matrix, C, from a feature associated with the set of measurements. Specifically, the cost calculation component 22 utilizes a change point detection analysis of the feature values to determine likelihood values for a next set of measurements given previous measurements. In one example, the cost calculation component 22 utilizes a Bayesian online change point detection algorithm in calculating the likelihood values.

The track assignment component 22 further comprises an object assignment component 24 configured to assign at least a subset of the measurements to respective tracks. It will be appreciated that some measurements may simply represent clutter and some tracks may not have a corresponding measurement of sufficient reliability for inclusion in the track, so less than all of the measurements and tracks may be assigned. For example, an optimization algorithm can be applied to find a lowest cost solution given the generated cost matrix. A filtering component 30 is configured to update respective associated states of tracks representing the plurality of moving objects according to the set of measurements and the assignment of the subset of the measurements to respective tracks. For example, a recursive filtering algorithm, which may be linear, such as a Kalman filter, or non-linear, can be applied to maintain an accurate position for each track.

Figure 2:
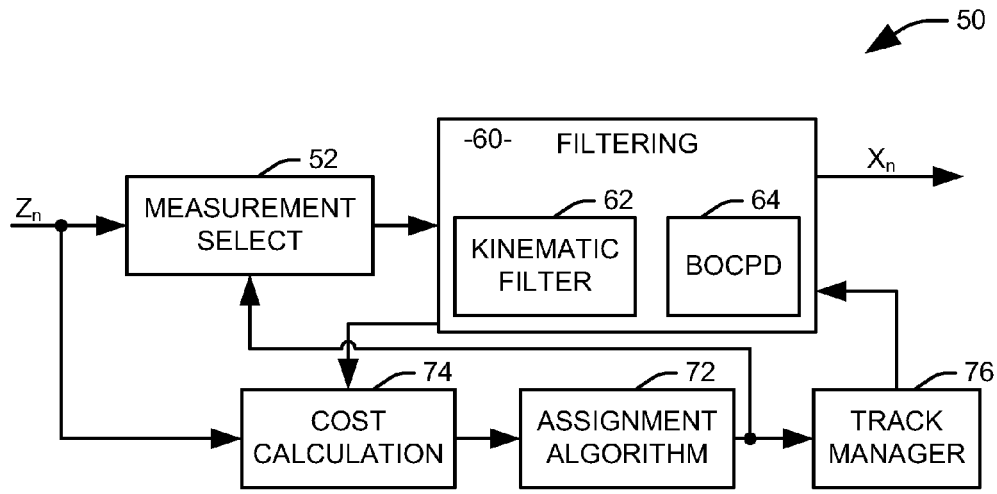
FIG. 2 illustrates an example of a radar tracking system utilizing radar cross-section as a feature for data association.

FIG. 2 illustrates an example of a radar tracking system 50 utilizing radar cross-section (RCS) as a feature for data association. Data association is the process of assigning data, or the measurements from sensors, to tracks. In the illustrated system, the data association utilizes a calculation of likelihood ratios, for example, the ratio of the likelihood that a particular observation is from a target track versus the likelihood that it is not, such as data originating from clutter or noise. When adding features to the kinematic measurements, the existing likelihood functions are generalized. For discrete attributes, the data can take on one of a finite number of possibilities. In this case, the likelihood ratios are determined by evaluating discrete probability distributions, and are consistently combined with those calculated from the kinematics and continuous feature variables to obtain an overall likelihood ratio of the entire measurement to be used in the data association algorithms. However, when a feature is independent of the kinematic measurements, the new likelihood function can be determined as the product of the kinematic likelihood and the likelihood for the feature alone. Accordingly, most features can be added to the calculation in a straightforward manner.

The RCS feature used in the illustrated system 50 is more complex. For RCS, the probability of target detection depends on the signal-to-noise ratio (SNR) of the radar return, which is proportional to the RCS. It will be appreciated that if the SNR is sufficiently low, a reasonable determination of the kinematic components of the measurement may not be available. Specifically, in the illustrated system, if the SNR is below a fixed threshold, the kinematic components are considered missing and the RCS component for that return is considered censored, with it assumed that the RCS is somewhere between zero and the threshold. This complicates the likelihood calculation.

In general, when incorporating parameters into the likelihood calculation, it can be safely assumed measurements are generated from an unchanging probability distribution with known, fixed parameters. Typically these distributions are assumed to be of the Swerling type, which are either exponential or gamma distributions, or a Rice distribution. Another complicating factor in properly incorporating RCS as a feature is that RCS parameters can change as the targets move, especially for sudden changes such as those due to a change in direction from a highly maneuvering target, for example. The inventors have improved on the use of RCS by using a change point detection algorithm. Specifically, the illustrated system uses Bayesian online change point detection (BOCPD) to model the RCS feature.

The BOCPD model is highly modular in that it looks for changes in the parameters of any underlying process model (UPM). The UPM merely needs to provide posterior predictive probabilities; the UPM can otherwise be a "black box". The BOCPD queries the UPM for a prediction of the next data point under each possible run length, the number of points since the last change point. If, and only if, the UPM is of an exponential family with a conjugate prior, the posterior is computed by accumulating the sufficient statistics since the last potential change point. This allows for O(1) UPM updates in both computation and memory as the run length increases. If the UPM for the RCS distribution is assumed to be of the Swerling type, the system can take advantage of this property. However, where the RCS is assumed to be Rice distributed, which is not part of the exponential family, the inventors have adapted variational Bayes (VB) inference to approximate the posterior distributions of the BOCPD models. This has required improvements to existing and limited approaches to online VB to implement these methods in the online tracking algorithms.

Further, to facilitate the addition of attribute data to the tracking algorithms, a general framework is provided to handle any categorical discrete data with a finite number of possible values. The prior distribution on the categorical states is assumed to come from a Dirichlet distribution. Since the Dirichlet distribution is conjugate to the categorical (multinomial) distribution, the resulting posterior distribution will also be Dirichlet with parameters that are simple algebraic functions of the data values and the prior parameters. This allows for extremely efficient analytic updates to the likelihood functions.

Turning to FIG. 2, a set of measurements, $Z_{n-1}$ can be assigned to associated tracks at a measurement selection component 52, as will be discussed in more detail below. The assigned measurement set can then provided to a filtering component 60 including a kinematic filter 62 configured to incorporate the assigned kinematic measurements into a recursive estimation process for determining positions of the plurality of moving objects. In the illustrated implementation, the kinematic filter 62 is implemented as a Kalman filter, but it will be appreciated that other linear and non-linear filters can be used. The filtering component 60 further comprises a change point detection algorithm 64 configured to determine a set of likelihood values representing predicted values for a next set of measurements, $Z_n$. In the illustrated implementation, the change point detection algorithm 64 is implemented as a Bayesian online change point detection (BOCPD) algorithm.

In the likelihood-based approach of the illustrated system 50, all observations are "fed" into a data assignment algorithm 72 through a likelihood function. Specifically, the data association algorithm 72 utilizes a cost matrix generated at a cost calculation component 74 from joint likelihoods for a sequence of two or more measurements. The kinematics likelihood can be provided via the kinematic filter 62, typically an interacting multiple model (IMM) composed of a nearly constant velocity and coordinated turn component. Feature specific models are used for each feature. An augmented filter class computes the joint likelihood of kinematic and non-kinematic features. Measurements are assumed to be composed of a vector of kinematic measurements followed by additional features, such as RCS. The augmented filter computes the total log likelihood by splitting the measurement vector up and adding the log likelihoods from the kinematic filter and feature model. The additive method of combination implements the independence assumption between the kinematics and the features.

In the illustrated system 50, the likelihood values are calculated at least in part from a radar cross section (RCS) feature. The RCS is a valuable feature to augment kinematic data, but as discussed previously, it is particularly challenging to incorporate since it is related to the missing data process in measurements and cannot be treated as an independent feature. With RCS, it is assumed that the measurement is observed if and only the RCS is above a known threshold. Therefore, likelihood contributions from tracks with no measurements utilize a probability of detection that is derived from a censored measurement on the RCS distribution. Accordingly, the model used in the system 50 has been implemented to be maximally modular as to allowing handling missing measurements as pseudo-measurements.

In the data association algorithm 72, the association vectors, a, which map measurements to tracks, are estimated. At each time step, $n \in \mathbb{N}_1$, $N_Z(n) \in \mathbb{N}_0$ measurements, $Z_n = \{z_{i,n}\}_{i=1}^{N_Z(n)}$, are observed, which include returns from both real targets and clutter, that is, spurious measurements. Here, $z_{i,n} \in \mathcal{Z}$ is a vector of kinematic measurements, that is, positions in $\mathbb{R}^3$, or $\mathbb{R}^4$ with a Doppler, augmented with an RCS component $R \in \mathbb{R}^+$ for the measured SNR, at time $t_n \in \mathbb{R}$. The assignment vector at time $t_n$ is such that $a_n(i)=j$ if measurement i is associated with track j>0; $a_n(i)=0$ if measurement i is clutter. The inverse mapping $a_n^{-1}$ maps tracks to measurements: meaning $a_n^{-1}(a_n(i))=i$ if $a_n(i) \neq 0$; and $a_n^{-1}(i)=0 \Leftrightarrow a_n(j) \neq i$ for all j. For example, if the number of tracks $N_T=4$ and a=[2 0 0 1 4] then $N_Z=5$, the number of clutter points $N_c=2$, and $a^{-1}=[4\ 1\ 0\ 5]$. Each track is associated with at most one measurement, and vice-versa.

In N-D data association, the algorithm 72 jointly finds the MAP (maximum a posteriori probability) estimate of the association vectors over a sliding window of the last N−1 time steps. It is assumed that $N_T(n) \in \mathbb{N}_0$ total tracks are present as a known parameter, $N_T(n)$, and that this number is adjusted over time. In the generative process, each track places a probability distribution on the next N−1 measurements, with both kinematic and RCS components. However, if the random RCS R for a measurement is below $R_0$, then it will not be observed. There are $N_c(n) \in \mathbb{N}_0$ clutter measurements from a Poisson process with $\lambda := \mathbb{E}[N_c(n)]$, often with uniform intensity. The ordering of measurements in $Z_n$ is assumed to be uniformly random. For 3-D data association the model joint is:

$$p(Z_{n-1:n}, a_{n-1}, a_n | Z_{1:n-2}) = \qquad (1)$$

where $p_i$ is the probability of the measurement sequence under track i and $p_0$ is the clutter distribution.

The probability $p_i$ is the product of the RCS component predictions (BOCPD) and the kinematic components (filter); informally, $p_i(z) = p_i$ (positions)=$p_i$(RCS). If there is a missed detection, i.e. $a_n^{-1}(i)=0$, the relation $p_i(z_{a_n^{-1}(i),n})=P(R<R_0)$ I used under the RCS model for track i with no contribution from the positional (kinematic) component. Just as BOCPD allows any black box probabilistic predictor to be used as a UPM, any black box model of measurement sequences can used in the above equation (1).

The assumed generative process in the data association algorithm 72 assumes $N_T(n) \in \mathbb{N}_0$ total tracks as a known parameter, although the number of tracks may change with time). A measurement is sampled at time $t_n$ from each track to get $N_Z(n)$ measurements that are added to list $Z_n \in \mathcal{Z}^{N_Z(n)}$. Each track keeps its measurement with probability of detection, $P_D = P(R > R_0 | \theta)$, determined by if the SNR, $R \in \mathbb{R}^+$, exceeds a fixed threshold, $R_0 \in \mathbb{R}^+$. If the SNR is not exceeded then the measurements for that track are deleted from $Z_n$. The number of clutter points, $N_c(n) \in \mathbb{N}_0$, is drawn from a Poisson distribution. This number of clutter measurements is drawn from the clutter distribution, such as a uniform distribution, and appended on the end of $Z_n$. This corresponds to a Poisson process. The order of the observations is arbitrary, so the ordering in $Z_n$ can be randomly permuted.

The data association is determined jointly over multiple time steps. In the illustrated system, the filters are updated to a time step n' and the generative process above is repeated. Two-dimensional data association algorithms take the MAP estimate of the association vector, $a_n$, where:

$$a_n(i) := \begin{cases} j, & \text{if measurement } i \text{ is associated with track } j > 0 \\ 0, & \text{if measurement } i \text{ is not associated with any track} \end{cases} \qquad (2)$$

$$i = 1, \ldots, N_Z(n),$$

Once the MAP estimate is determined, the algorithm updates the filters as if $a_n$ were true. By contrast, 3-D association algorithms will jointly find the MAP estimate of $(a_{n-1}, a_n)$ in a sliding window fashion. It will take $a_{n-1}$ as the true association vector at the previous time step. Therefore, 3-D association algorithms have an extra time step to change a tentative association if the data warrants it. The same sliding window pattern is repeated for N-dimensional association algorithms. The estimation of association vectors for the 3-D case becomes an optimization problem of the form:

$$(\hat{a}_{n-1}, \hat{a}_n) = \operatorname{argmax}_{(a_{n-1}, a_n)} \log P(a_{n-1}, a_n | Z_{1:n}) =$$
$$\operatorname{argmax}_{(a_{n-1}, a_n)} \log P(Z_{n-1:n}, a_{n-1}, a_n | Z_{1:n-2}), \qquad (3)$$

In accordance with an aspect of the present invention, the data assignment algorithm 72 is configured to probabilistically handle change point methods, which allow the parameters of the feature model to suddenly change. To this end, it is assumed that a time series is available with n observations, $y_1, \ldots, y_n \in \mathcal{Y}$. In effect, BOCPD performs message passing to do online inference on the run length $r_n \in 0:n-1$, the number of observations since the last change point. Given an underlying predictive model (UPM) and a hazard function, H, an exact posterior over the run length $r_n$ can be computed. Conditional on a run length, the UPM produces a sequential prediction on the next data point using all the data since the last change point: $p(y_n | y_{(r)}, \Theta_m)$, where $(r) := (n-r):(n-1)$. The UPM is a simpler model where the parameters $\theta$ change at every change point and are modeled as being sampled from a prior with hyper-parameters $\Theta_m$. The canonical example of a UPM would be a Gaussian whose mean and variance change at every change point.

In the illustrated system 50, the run length $r_n \in \mathbb{N}_0$ is incremented every observation until there is a change point, when it is reset to zero. The hazard function $H(r | \Theta_h) \in \mathbb{N} \to [0,1]$ is the prior probability of a change point occurring given a run length r. The change point vector $c_n \in \{0,1\}$ is defined to be true (1) if there is a change point at observation n and false (0) otherwise. Notice that through $H(r | \Theta_h)$ it is possible to specify, a priori, arbitrary duration distributions for parameter regimes. All of the hyper-parameters can be summarized as $\Theta := \{\Theta_h, \Theta_m\}$.

It is assumed that $r_0=0$, meaning there is a change point at n=0, as an initial condition. However, more general initial state distributions are possible in this framework. $\tau_i$ is defined as the index of the ith change point, where $\tau_0 := 0$. The quantities are related by:

$$r_n = \begin{cases} 0, & c_n = 1 \\ r_{n-1} + 1, & c_n = 0 \end{cases}, \sum_{n=1}^{\tau_i} c_n = i, c_{\tau_i} = 1. \qquad (4)$$

Therefore, there is a change point at observation $n \Leftrightarrow c_n=1 \Leftrightarrow r_n=0 \Leftrightarrow \tau_i=n$ for some i. Meaning $\tau$ is a sorted list of change point indices. Since the r, c, and $\tau$ are discrete and related via a bijection:

$$P(\tau)=P(c)=P(r)=\Pi_{n=1}^{N} H(r_{n-1}+1)^{c_n}(1-H(r_{n-1}+1))^{1-c_n}. \quad (5)$$

The domains of each of these variables are $c \in \{0,1\}^N$, $r \in \mathbb{N}_0^N$, and $\tau = \{1, \ldots, N\}^M$. We observe $y_n$ for $n=\{1, \ldots, N\}$. It should be noted that the indexing convention is somewhat counter-intuitive: If $c_n=1$ then $y_{n+1}$ is the first data point sampled from the new model and $y_n$ is sampled from the old model. Hence, $P(r_n=0|y_{1:n})$ is the probability there is a change point at observation n without observing the first data point in the new regime $y_{n+1}$. To include the first data point in the new regime, it is necessary to determine $P(r_n=0|y_{1:n+1})$. Summarizing the model, using the probability of everything (POE) (and using $\tau_{M+1}=N$ for notational convenience):

$$\log p(y_{1:N}, c_{1:N} | \Theta) = \log p(y_{1:N} | c_{1:N}, \Theta_m) + \quad (6)$$
$$\log P(c_{1:N} | \Theta_h)$$
$$= \sum_{i=0}^{M} \log p(y_{\tau_i+1:\tau_{i+1}} | \Theta_m) +$$
$$\sum_{n=1}^{N} \log(H(r_{n-1}+1))c_n +$$
$$\log(1 - H(r_{n-1}+1))(1-c_n),$$

BOCPD calculates the posterior run length at observation n, i.e. $P(r_n|y_{1:n})$, sequentially. This posterior is used to make online predictions robust to underlying regime changes through marginalization of the run length variable:

$$p(y_{n+1} | y_{1:n}) = \quad (7)$$
$$\sum_{r_n} p(y_{n+1} | y_{1:n}, r_n) P(r_n | y_{1:n}) = \sum_{r_n} p(y_{n+1} | y_{(r)}) P(r_n | y_{1:n}),$$

where $y_{(r)}$ refers to the last $r_n$ observations of y, and $p(y_{n+1}|y_{(r)})$ is computed using the UPM.

The run length posterior is found by normalizing the joint likelihood:

$$P(r_n | y_{1:n}) = \frac{p(r_n, y_{1:n})}{\sum_{r_n} p(r_n, y_{1:n})}. \quad (8)$$

The joint likelihood is updated online using a recursive message passing scheme:

$$msg_n := p(r_n, y_{1:n}) = \quad (9)$$
$$\sum_{r_{n-1}} p(r_n, r_{n-1}, y_{1:n}) = \sum_{r_{n-1}} p(r_n, y_n | r_{n-1}, y_{1:n-1}) p(r_{n-1}, y_{1:n-1}) =$$
$$\sum_{r_{n-1}} \underbrace{P(r_n | r_{n-1})}_{hazard} \underbrace{p(y_n | r_{n-1}, y_{(r)})}_{UPM} \underbrace{p(r_{n-1}, y_{1:n-1})}_{msg_{n-1}}.$$

This defines a forward message passing scheme to recursively calculate $msg_n$ from $msg_{n-1}$. The conditional is restated in terms of messages as $P(r_n|y_{1:n}) \propto msg_n$. All the distributions mentioned so far are implicitly conditioned on the set of hyper-parameters $\Theta$.

Once the data assignments are complete, they are provided to the filtering component 60 and a track manager 76. The track manager assigns identifies and removes tracks that are no longer active and generates new tracks for some or all of the measurements that were not paired to tracks. The updated list of tracks is then provided to the filtering component for a next iteration of tracking.

Figure 3:
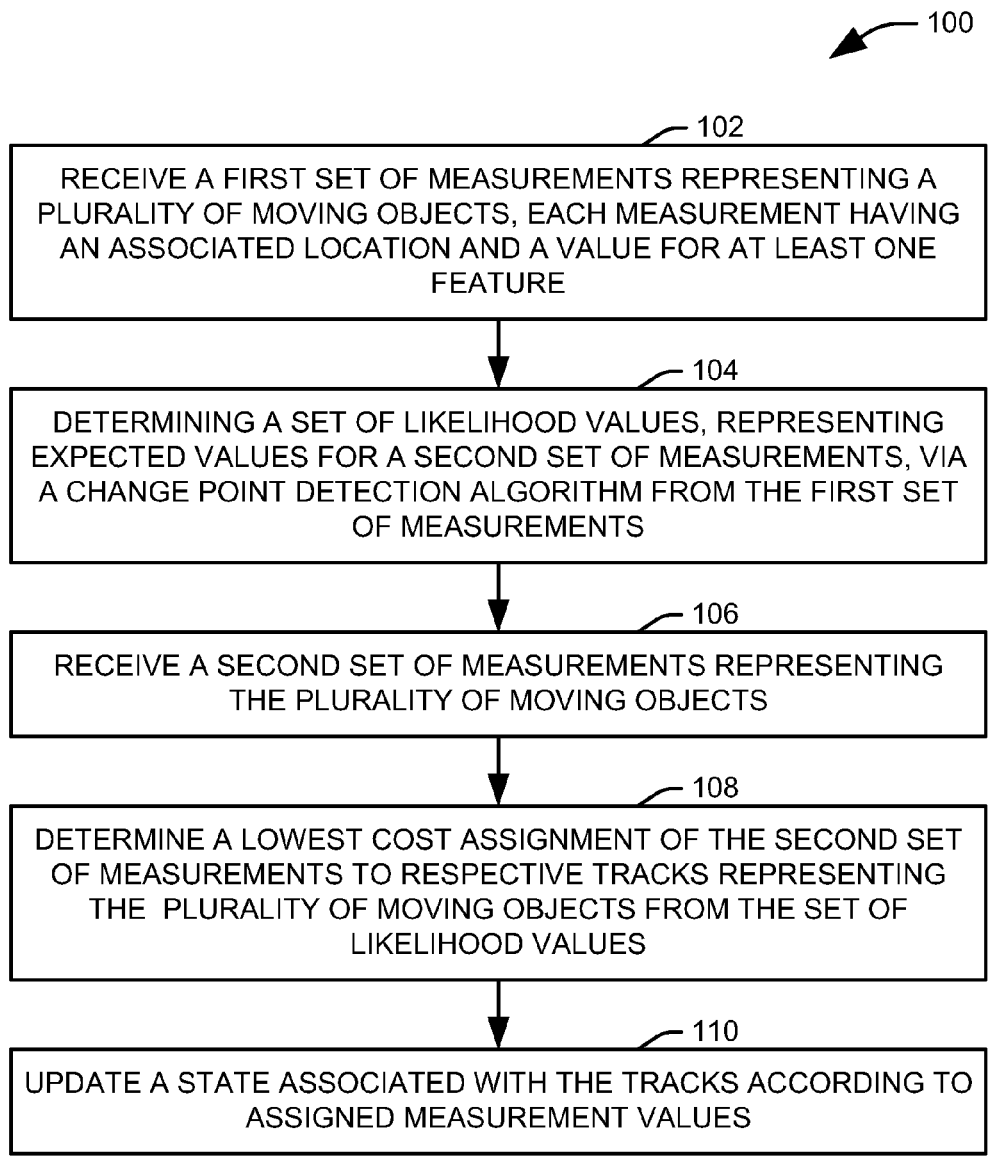
FIG. 3 illustrates one example of a method for tracking moving objects.

In view of the foregoing structural and functional features described above, a method in accordance with various aspects of the present invention will be better appreciated with reference to FIG. 3. While, for purposes of simplicity of explanation, the method of FIG. 3 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect the present invention.

FIG. 3 illustrates one example of a method 100 for tracking moving objects. At 102, a first set of measurements is received, representing a plurality of moving objects. Each measurement has an associated location and a value for at least one feature. In one example, the feature is a radar cross section. At 104, a set of likelihood values, representing expected values for a second set of measurements, is determined from the first set of measurements via a change point detection algorithm. In one implementation, the set of likelihood values is determined via a Bayesian online change point detection algorithm, with an underlying process model of the Bayesian online change point detection algorithm implemented using variational Bayesian inference. This is particularly useful where an underlying process model of the at least one feature associated with the first set of measurements is not part of an exponential family of models with a conjugate prior.

In this arrangement, a hazard function is computed for each of a plurality of run lengths, and a run length distribution vector is updated. Any entries in the run length distribution vector below a threshold value are then removed. An underlying process model (UPM) associated with the feature can then be called to compute a variational lower bound for each run length as a conditional probability of the run length, given the available measurements. This vector of run lengths can be multiplied in an elementwise fashion by the run length distribution and normalized to provide the set of predictive log likelihoods. The UPM states are then updated with the new measurements.

At 106, a second set of measurements representing the plurality of moving objects is received. At 108, a lowest cost assignment of the second set of measurements to respective tracks representing the plurality of moving objects is determined from the set of likelihood values. In one implementation, the lowest cost assignment is determined according to an N-dimensional data assignment process such that the track assignment jointly finds a maximum a posteriori probability estimate of the association vectors over a sliding window of the last N-1 time steps, where N is a positive integer greater than one. Specifically, a MAP estimate is determined by determining all possible assignments of the data from the N-1 time steps to the N tracks and computing a log likelihood from each. A lowest cost assignment can be determined from these log likelihood values.

At 110, a state associated with the tracks is updated according to assigned measurement values. For example, this can be done with a Kalman filter or a linear or non-linear variant of the Kalman filter. In the updating, for each track to which no measurement could be assigned, a missed measurement is assigned. All tracks to which a measurement has been assigned are updated with the newly assigned logic. Track maintenance logic is applied and tracks that are no longer active are identified and removed. Any unpaired measurements can be assigned to new tracks, which are updated with the unpaired measurements.

Figure 4:
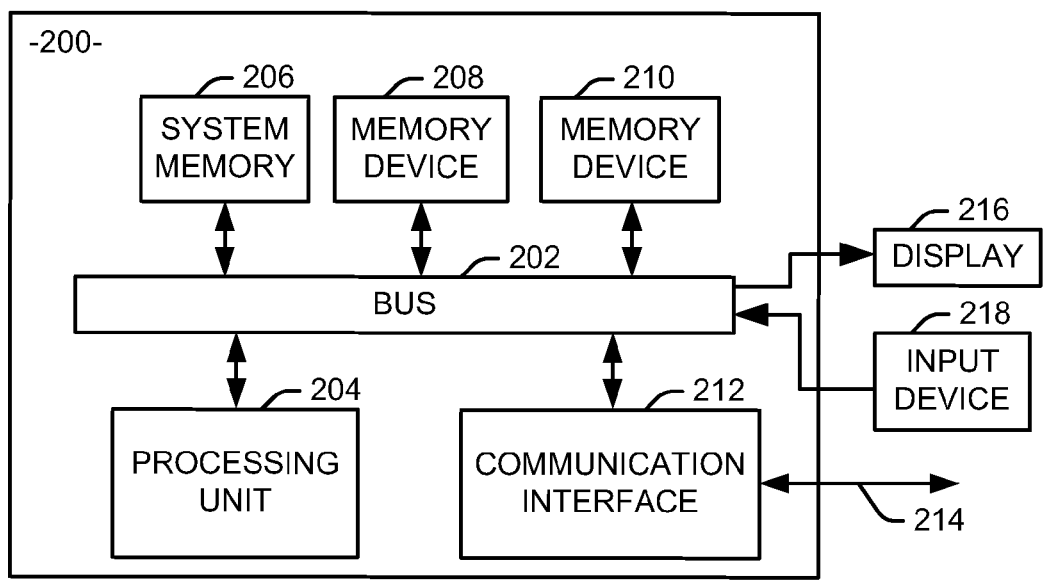
FIG. 4 illustrates a schematic block diagram illustrating an exemplary system of hardware components capable of implementing examples of the systems and methods disclosed in FIGS. 1-3.

FIG. 4 is a schematic block diagram illustrating an exemplary system 200 of hardware components capable of implementing examples of the systems and methods disclosed in FIGS. 1-3. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand-alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of an object tracking system utilizing change point detection. Computer executable logic for implementing the system control 126 resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution, and can include either a single medium or multiple non-transitory media operatively connected to the processing unit 204.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

Having described the invention, we claim:

1. A system for tracking moving objects comprising:
a sensor system configured to measure a position of each of a plurality of moving objects as a set of measurements;
a track assignment component configured to accept the set of measurements from the sensor system and assign a subset of the measurements to respective tracks, a given track representing the motion of an object of the plurality of moving objects, the track assignment component comprising:
a cost calculation component configured to provide a cost matrix from at least a change point detection analysis of a feature associated with the set of measurements, the feature associated with the set of measurements being modelled as a non-exponential distribution; and
an object assignment component configured to assign the subset of the measurements to respective tracks; and
a filtering component configured to update respective associated states of tracks representing the plurality of moving objects according to the set of measurements and the assignment of the subset of the measurements to respective tracks.

2. The system of claim 1, wherein the change point detection analysis utilizes Bayesian online change point detection.

3. The system of claim 1, wherein the filtering component comprises a Kalman filter.

4. The system of claim 1, wherein the filtering component comprises a non-linear filter.

5. The system of claim 1, wherein the feature associated with the set of measurements is a radar cross section.

6. The system of claim 1, wherein the feature associated with the set of measurements is modelled as a Rice distribution.

7. The system of claim 1, wherein an underlying process model of the change point detection algorithm is evaluated using variational Bayesian inference.

8. The system of claim 1, wherein the track assignment component assigns the subset of the measurements to respective tracks according to an N-dimensional data assignment process such that the track assignment jointly finds a maximum a posteriori probability estimate of the association vectors over a sliding window of the last N−1 time steps, where N is a positive integer greater than one.

9. The system of claim 8, wherein the track assignment component assigns the subset of the measurements to respective tracks according to a 3-dimensional data assignment process such that the track assignment jointly finds a maximum a posteriori probability estimate of the association vectors over a sliding window of the last two time steps.

10. A method for tracking moving objects comprising:
receiving, at a radar tracking processor, a first set of measurements from a radar system representing a plurality of moving objects, each measurement having an associated location and a value for at least one feature;
determining a set of likelihood values, representing expected values for a second set of measurements, from the first set of measurements via a change point detection algorithm;
receiving a second set of measurements representing the plurality of moving objects;
determining a lowest cost assignment of the second set of measurements to respective tracks representing the plurality of moving objects from the set of likelihood values according to an N-dimensional data assignment process such that the lowest cost assignment jointly finds a maximum a posteriori probability estimate of association vectors over a sliding window of the last N−1 time steps, where N is a positive integer greater than one; and
updating a state associated with the tracks according to assigned measurement values.

11. The method of claim 10, wherein determining the set of likelihood values from the first set of measurements via the change point detection algorithm comprises determining the set of likelihood values from the first set of measurements via a Bayesian online change point detection algorithm.

12. The method of claim 11, wherein an underlying process model of the Bayesian online change point detection algorithm is evaluated using variational Bayesian inference.

13. The method of claim 10, wherein an underlying process model of the at least one feature associated with the first set of measurements is not part of an exponential family of models with a conjugate prior.

14. The method of claim 10, where the at least one feature includes a radar cross-section.

15. The method of claim 10, wherein determining the lowest cost assignment of the second set of measurements to respective tracks representing the plurality of moving objects from the set of likelihood values comprises determining the lowest cost assignment according to an N-dimensional data assignment process such that the track assignment jointly finds a maximum a posteriori probability estimate of the association vectors over a sliding window of the last N−1 time steps, where N is a positive integer greater than one.

16. A non-transitory computer readable medium, storing executable instructions readable by an associated processor to track at least respective positions of a plurality of moving objects, the executable instructions comprising:
a track assignment component configured to receive a set of measurements representing at least a position and a radar cross-section of each of the plurality of moving objects and assign a subset of the measurements to respective tracks, a given track representing the motion of an object of the plurality of moving objects, the track assignment component comprising:
a cost calculation component configured to provide a cost matrix from at least a Bayesian online change point detection analysis of the radar cross-section associated with the set of measurements, an underlying process model of the change point detection algorithm being evaluated using variational Bayesian inference; and
an object assignment component configured to assign the subset of the measurements to respective tracks; and
a filtering component configured to update respective associated states of tracks representing the plurality of moving objects according to the set of measurements and the assignment of the subset of the measurements to respective tracks.

17. The non-transitory computer readable medium of claim 16, wherein the track assignment component assigns the subset of the measurements to respective tracks according to an N-dimensional data assignment process such that the track assignment jointly finds a maximum a posteriori probability estimate of the association vectors over a sliding window of the last N−1 time steps, where N is a positive integer greater than one.

18. The non-transitory computer readable medium of claim 16, wherein the filtering component comprises a Kalman filter.

* * * * *